(12) United States Patent
Komatsubara et al.

(10) Patent No.: US 6,871,564 B2
(45) Date of Patent: Mar. 29, 2005

(54) CONTROL LEVER SYSTEM FOR PARKING BRAKE

(75) Inventors: Masahiko Komatsubara, Wako (JP); Masahiro Imamachi, Wako (JP); Hiroshi Inakazu, Wako (JP); Tsutomu Tomimitsu, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/986,688

(22) Filed: Nov. 9, 2001

(65) Prior Publication Data

US 2002/0062710 A1 May 30, 2002

(30) Foreign Application Priority Data

Nov. 13, 2000 (JP) ........................................ 2000-345095

(51) Int. Cl.[7] .................................................. G05G 1/04
(52) U.S. Cl. .............................. 74/523; 74/537; 74/491
(58) Field of Search .......................... 74/538, 537, 491, 74/523, 543, 545, 546, 547, 529, 527, 536

(56) References Cited

U.S. PATENT DOCUMENTS

| 2,146,121 | A | * | 2/1939 | Jandus et al. .................. 74/537 |
| 2,271,846 | A | * | 2/1942 | Skareen ........................ 74/537 |
| 3,990,322 | A | | 11/1976 | Hoffmann |
| 4,127,042 | A | | 11/1978 | Lipshield |
| 4,169,312 | A | * | 10/1979 | Mar ............................. 30/337 |
| 5,682,789 | A | * | 11/1997 | DeCrouppe et al. .......... 74/335 |
| 6,234,041 | B1 | * | 5/2001 | Larabet et al. ................ 74/523 |
| 6,282,980 | B1 | * | 9/2001 | Sykes .......................... 74/528 |

FOREIGN PATENT DOCUMENTS

| DE | 3727625 C1 | * | 1/1989 | ............. B60T/7/08 |
| EP | 02020460 | | 1/1990 | |
| EP | 0520401 a1 | * | 12/1992 | ............. B60T/7/08 |
| FR | 2 736 884 A | | 1/1997 | |
| GB | 1 237 205 A | | 6/1971 | |
| JP | 5-39975 | | 10/1993 | |

* cited by examiner

Primary Examiner—David A. Bucci
Assistant Examiner—Bradley J. Van Pelt
(74) Attorney, Agent, or Firm—Sughrue Mion, PLLC

(57) ABSTRACT

A control lever system for a parking brake includes a control lever for a parking brake attached to an interior equipment of a vehicle, the control lever moving between an operating position B and a releasing position A, and a recess provided for accommodating the control lever in the releasing position A. A releasing knob, operated for returning the control lever from the operating position B to the releasing position A, is disposed on a side face of a grip of the control lever, the side face corresponding to an opened face of the recess, so that the gap g between an inner wall of the recess and a head of the grip can be narrowed without being interfered with by the releasing knob.

10 Claims, 11 Drawing Sheets

CONTROL LEVER SYSTEM FOR PARKING BRAKE

BACKGROUND OF THE INVENTION

1. Field of the Invention

The present invention relates to a control lever system for a parking brake and, more particularly, to an improvement of a control lever system for a parking brake, in which a recess is provided in interior equipment of a motor vehicle, and in which a releasing knob for returning the control lever from an operating position to a releasing position is disposed on a peripheral surface of a grip of the control lever, the peripheral surface corresponding to an opened face of the recess.

2. Description of the Related Art

A control lever for the parking brake can include a releasing knob in a protruding state on a head of a grip, which knob is operated for returning the control lever from the operating position to the releasing position (for example, see Japanese Utility Model Publication No. 5-39975). However, this control lever is not well integrated into the interior equipment.

An example of a control lever for a parking brake, for motor vehicles such as automobiles, is disclosed in U.S. Pat. No. 3,990,322 to Hoffmann. The Hoffmann hand brake arrangement is integrated into a storage tray that is part of a center tunnel between the front seats in an automobile. However, if an attempt is made to attach a control lever having the above-described releasing knob to the interior equipment, so that the control lever is accommodated in the recess of the interior equipment in the releasing position, a space for receiving a driver's finger for operating the releasing knob must be secured in the recess. Such a recessed space cannot be provided in the interior equipment while maintaining an integrated structure. In addition, a control lever system with such a configuration adversely affects the beauty of the interior equipment.

SUMMARY OF THE INVENTION

The present invention has been accomplished with such circumstance in view, and it is an object of the present invention to provide a control lever system of the above-described type for a parking brake, wherein it is possible to provide integration between the control lever having the releasing knob and the interior equipment. The integration contributes to an enhancement in beauty of the interior equipment.

To achieve the above object, according to a first aspect of the present invention, there is provided a control lever system for a parking brake, in which a control lever for a parking brake is mounted to an interior equipment of a vehicle for moving between an operating position in which it operates the parking brake, and a releasing position in which it releases the operation of the parking brake. A recess is provided for accommodating the control lever when the control lever occupies the releasing position, wherein a releasing knob operated for returning the control lever from the operating position to the releasing position is disposed on a peripheral surface of a grip of the control lever, the peripheral surface corresponding to an opened face of the recess.

In the first aspect, when the control lever is in the releasing position, it is accommodated in the recess of the interior equipment. Moreover, since the releasing knob is disposed on the peripheral surface of the grip corresponding to the opened face of the recess, the gap between an inner wall of the recess and a head of the grip can be narrowed without being interfered in any way by the releasing knob, and it is possible to effectively integrate the interior equipment and the control lever, to provide an enhancement in beauty of the interior equipment. In addition, the releasing knob exists on the peripheral surface of the grip and hence, when the grip is grasped, a driver can operate the releasing knob by fingers grasping the grip. Namely, it is unnecessary to take the trouble of moving the driver's thumb toward the head of the grip, as in the prior art, leading an improved operability of the releasing knob.

According to a second aspect of the present invention, there is provided a control lever system for a parking brake, in which a control lever for a parking brake is mounted to an interior equipment of a vehicle for moving between an operating position in which it operates the parking brake, and a releasing position in which it releases the operation of the parking brake. A recess is provided for accommodating the control lever when the control lever occupies the releasing position, wherein a releasing knob operated for returning the control lever from the operating position to the releasing position is disposed on a peripheral surface of a grip of the control lever, the peripheral surface facing a bottom surface of the recess.

Also with the second aspect, the gap between an inner wall of the recess and a head of the grip can be narrowed without being interfered in any way by the releasing knob, and it is possible to effectively integrate the interior equipment and the control lever, to provide an enhancement in beauty of the interior equipment. In addition, the releasing knob exists on the peripheral surface of the grip and hence, when the grip is grasped, a driver can operate the releasing knob by fingers grasping the grip, leading to an improved operability of the releasing knob. Moreover, the releasing knob is hidden in the recess and hence, it is possible to provide an enhancement in beauty of the control lever.

According to a third aspect of the present invention, in addition to the first or second aspect, a positioning means is provided between an inner wall of the recess and a head of the grip for defining the releasing position of the control lever, to ensure that outer surfaces of the interior equipment and the control lever are substantially flush with each other.

With the third aspect, it is possible to provide a continuity to outer surfaces of the interior equipment and the control lever to effectively integrate the interior equipment and the control lever. Moreover, the positioning means does not appear on the surface of the interior equipment, which is advantageous for maintaining the beauty of the interior equipment, while ensuring a space for insertion of the driver's fingers grasping the grip.

According to a fourth aspect of the present invention, in addition to any of the first to third aspects, a protrusion is formed on the head of the grip to project toward the bottom surface of the recess, to define the limit of grasping of the head of the grip by a driver.

With the fourth aspect, when the driver grasps the grip, the protrusion prevents the driver's fingers from projecting above the head of the grip. Therefore, it is possible to previously prevent the fingers grasping the grip from being sandwiched and/or pinched between the head of the grip and the inner wall of the recess, when the control lever is returned from the operating position to the releasing position.

BRIEF DESCRIPTION OF THE DRAWING FIGURES

DETAILED DESCRIPTION OF THE PREFERRED EMBODIMENT(S)

Figure 1:
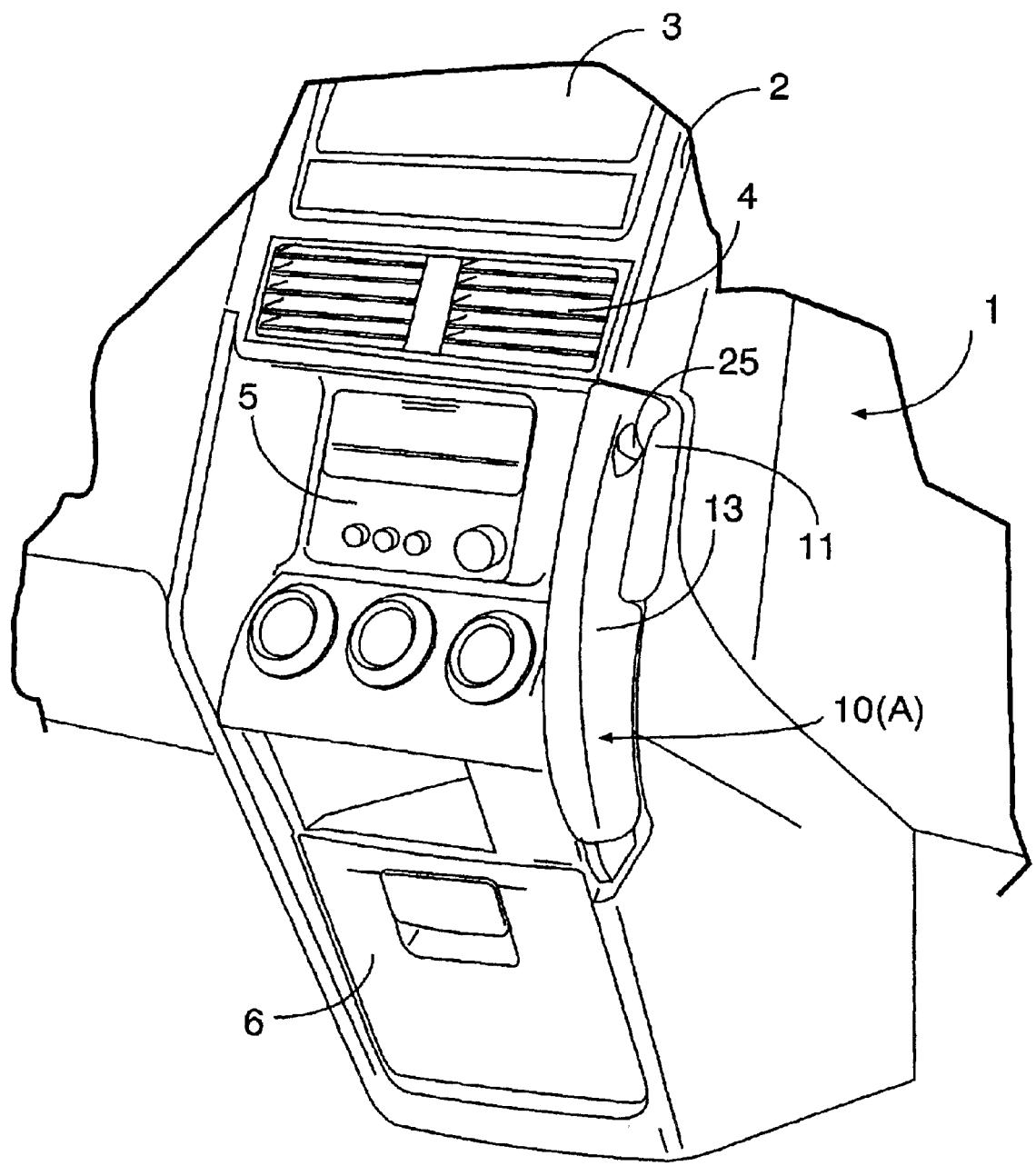
FIG. 1 is a perspective view of a control lever system for a parking brake, which has been returned into a releasing position, in a first embodiment of the present invention.

The foregoing as well as other objects and advantages of the present invention will be readily apparent to those skilled in the art from the following detailed description, wherein only the preferred exemplary embodiments of the invention are described with reference to the accompanying drawing figures. As will be realized, the invention is capable of other and different embodiments, and its several details are intended to encompass all possible modifications that fall within the spirit of the invention, which is defined by the accompanying claims.

In the disclosed embodiments, like reference characters represent like objects. In the exemplary figures, the interior equipment corresponds to a console box 2 and to a center console 33.

Figure 2:
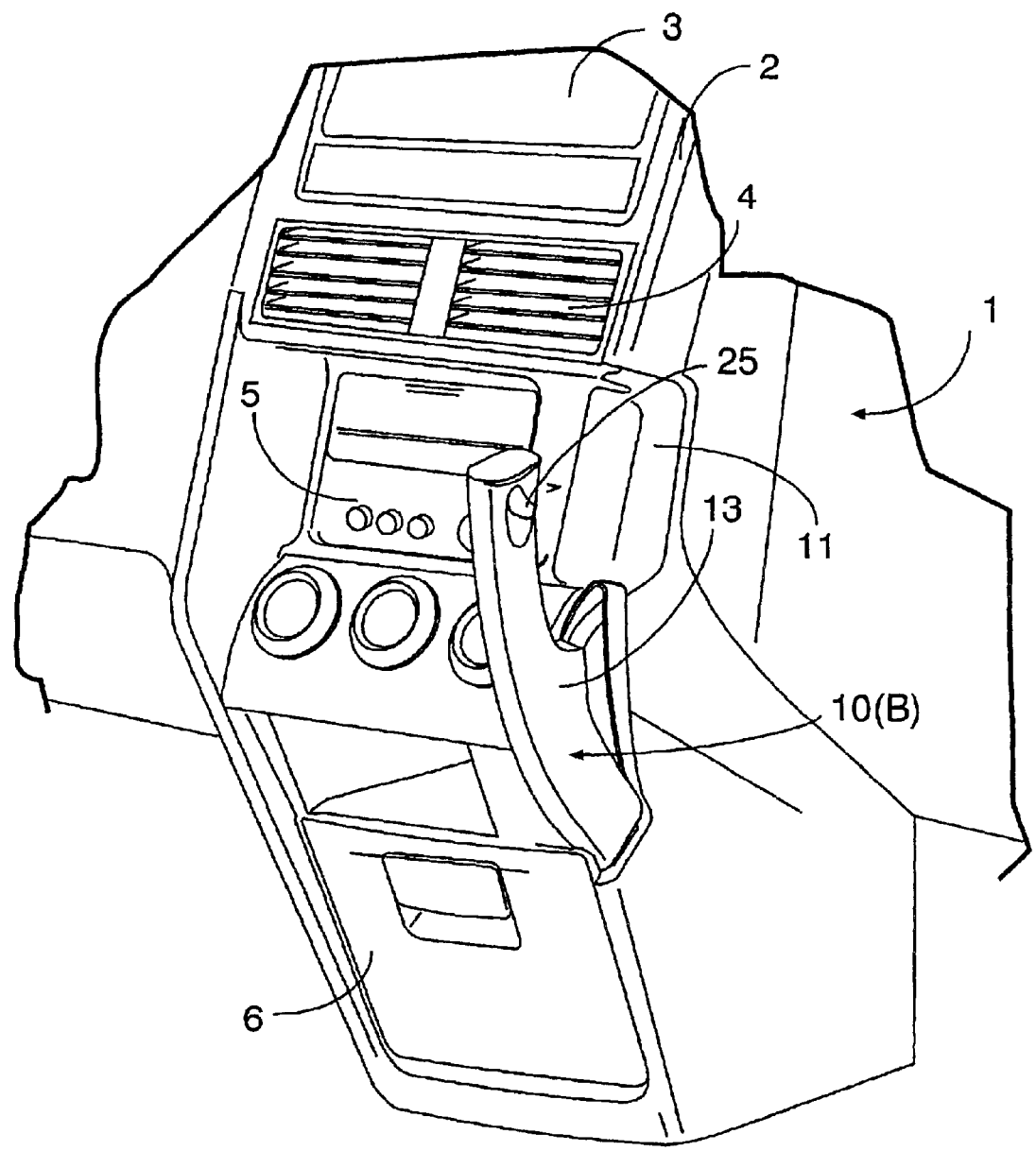
FIG. 2 is a perspective view of the control lever system for a parking brake, which has been returned into an operating position, in a first embodiment of the present invention.
Figure 3:
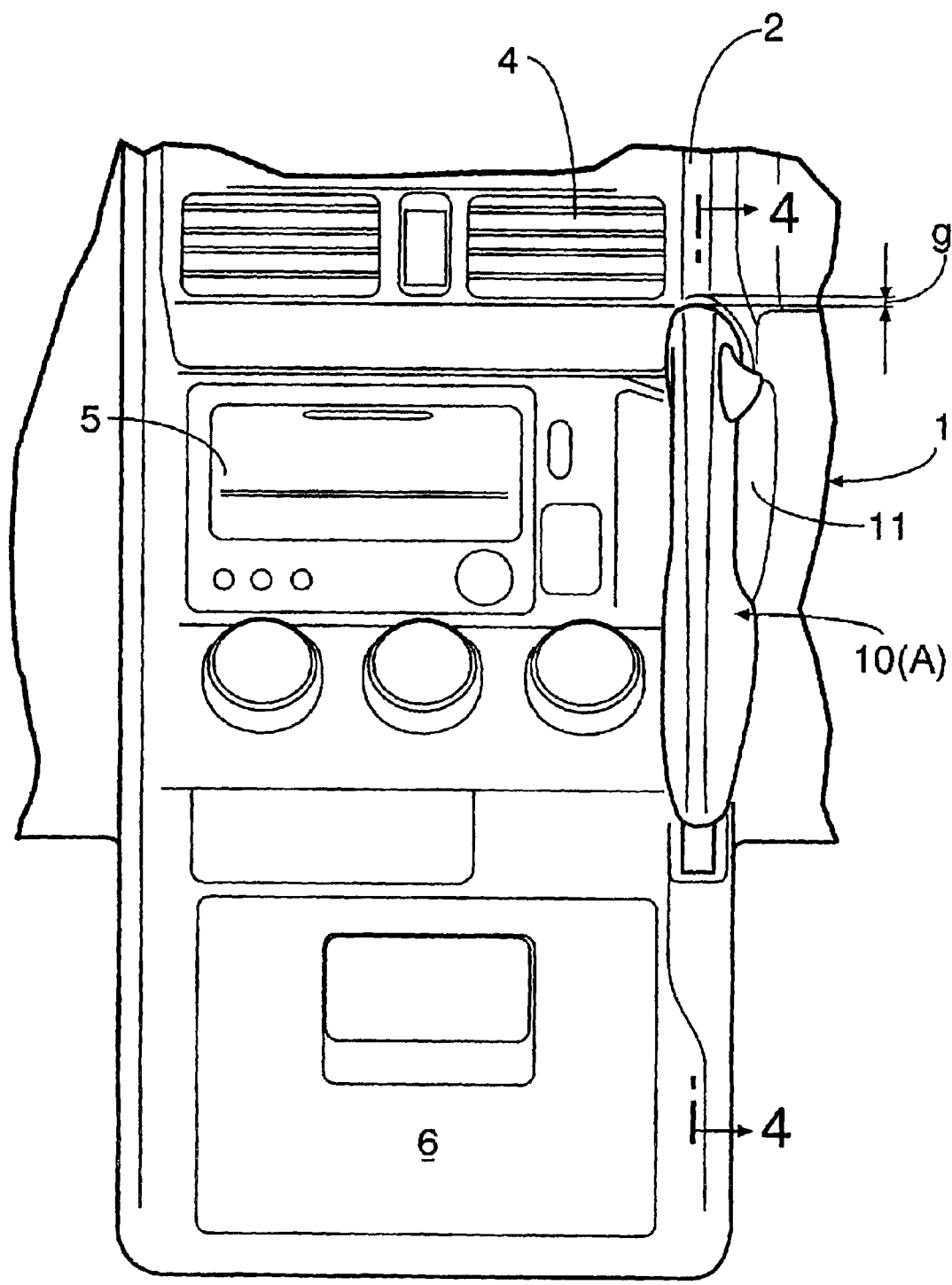
FIG. 3 is a front view of the control lever system shown in FIG. 1.

A first embodiment of the present invention shown in FIGS. 1 to 7 is first described. Referring first to FIGS. 1 to 3, a car navigation device 3, an air-conditioning air blow-off grille 4, an audio instrument 5, a glove compartment 6 and other apparatus are mounted on a console box 2 formed at a central portion of an instrument panel 1 of an automobile. A control lever 10 for a parking brake is disposed at a side edge of the console box 2 adjacent a driver's seat (a right side edge in the illustrated embodiment). The control lever 10 is capable of being moved between a releasing position A (a state shown in FIG. 1) in which it has been accommodated in a notched recess 11 defined in the side edge of the console box 2 adjacent the driver's seat, and an operating position B (a state shown in FIG. 2) in which it has been moved out of the recess 11.

Figure 4:
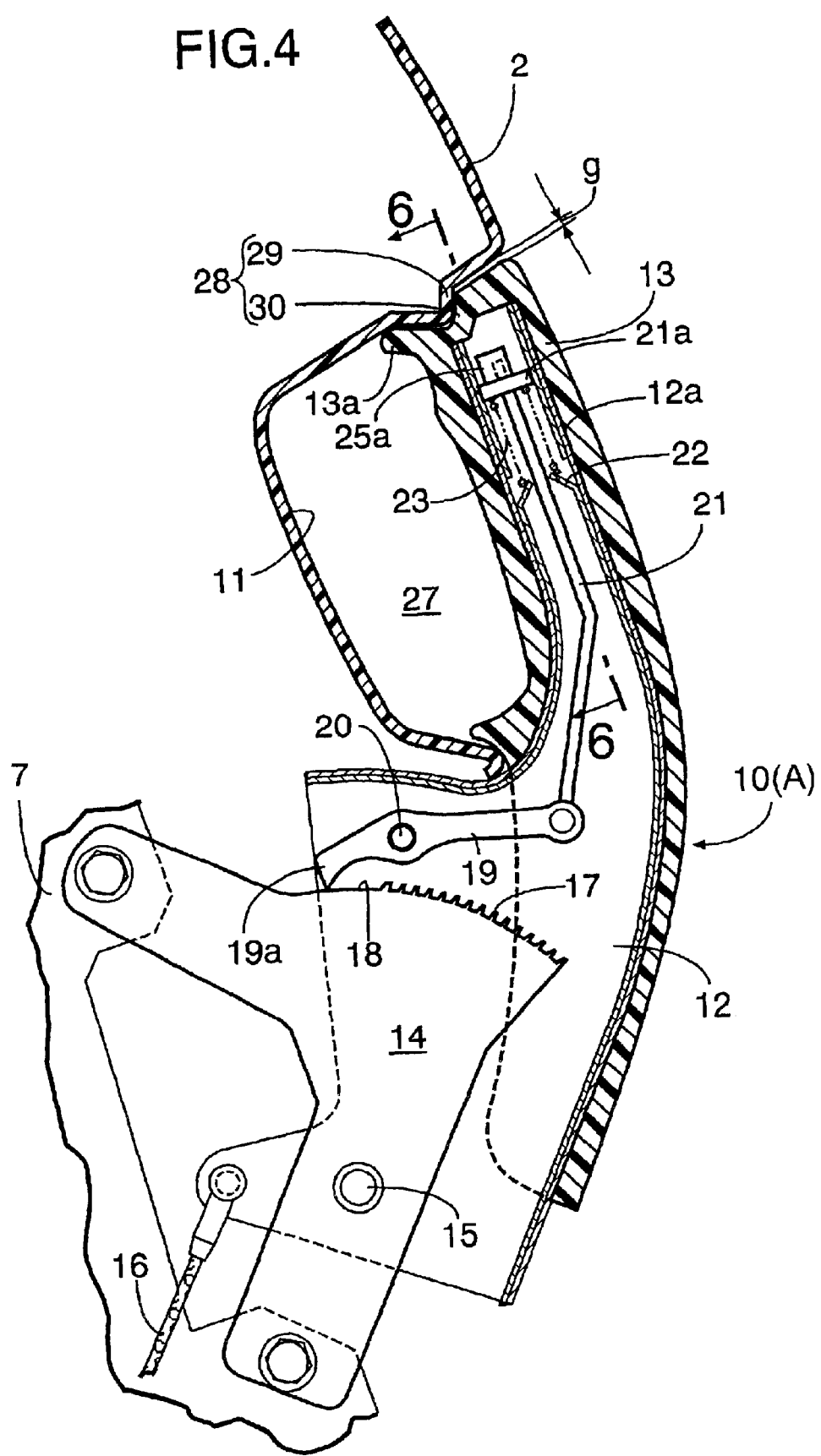
FIG. 4 is a sectional view taken along a line 4—4 in FIG. 3.
Figure 5:
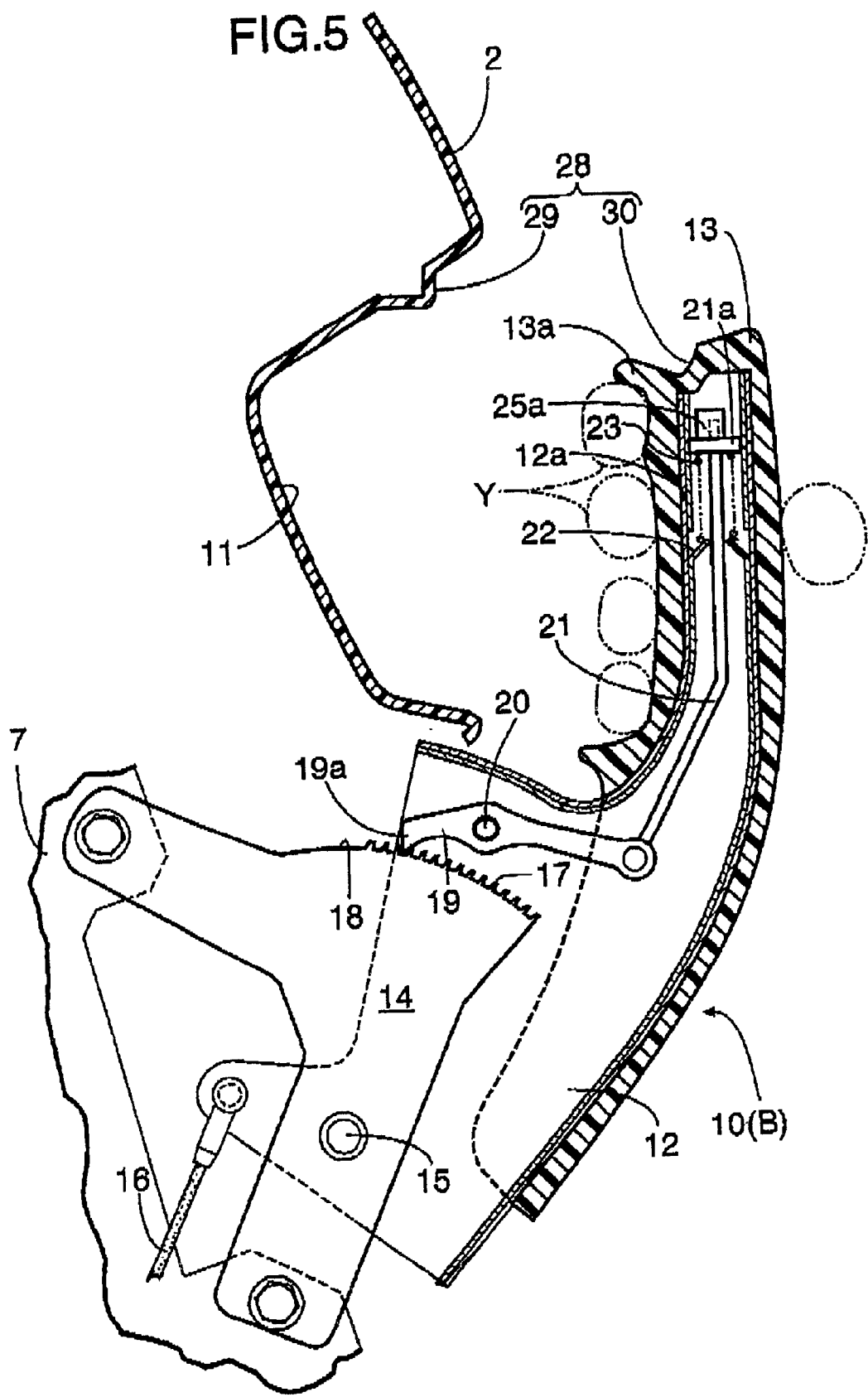
FIG. 5 is a view similar to FIG. 4, but showing the control lever in the operating position.

As shown in FIGS. 4 and 5, the control lever 10 includes a lever body 12 having a hollow grip portion 12a made of a steel plate, and a grip 13 made of a synthetic resin and covering an outer peripheral surface of the grip portion 12a. The lever body 12 extends through a front wall of the console box 2 with its base end reaching the inside of the console box 2, and is mounted through a pivot 15 to a bracket 14 which is secured to a supporting frame 7 of the instrument panel 1. A brake wire 16 leading to the control lever for the parking brake (not shown) is connected to the base end of the lever body 12.

The bracket 14 is formed with a ratchet gear 17 which is fan-shaped about the pivot 15, and a flat face 18 connected to one end of the ratchet gear 17. A ratchet pole 19 is turnably attached to the lever body 12 through a support shaft 20 and has, at one end, a claw 19a capable of being sequentially brought into engagement with the flat face 18 and the ratchet gear 17. The claw 19a is adapted to be brought into engagement with the flat face 18 in the releasing position of the control lever 10 and with any point of the ratchet gear 17 in the operating position B.

A connecting rod 21 accommodated in the grip portion 12a of the lever body 12 is pivotally connected at one end to the other end of the ratchet pole 19, and an operating spring 23, for biasing the connecting rod 21 in a direction to engage the ratchet pole 19 and the ratchet gear 17, is mounted under compression between a flange 21a, formed at the other end of the connecting rod 21, and a seat piece 22 projectingly provided on an inner wall of the grip portion 12a.

Figure 6:
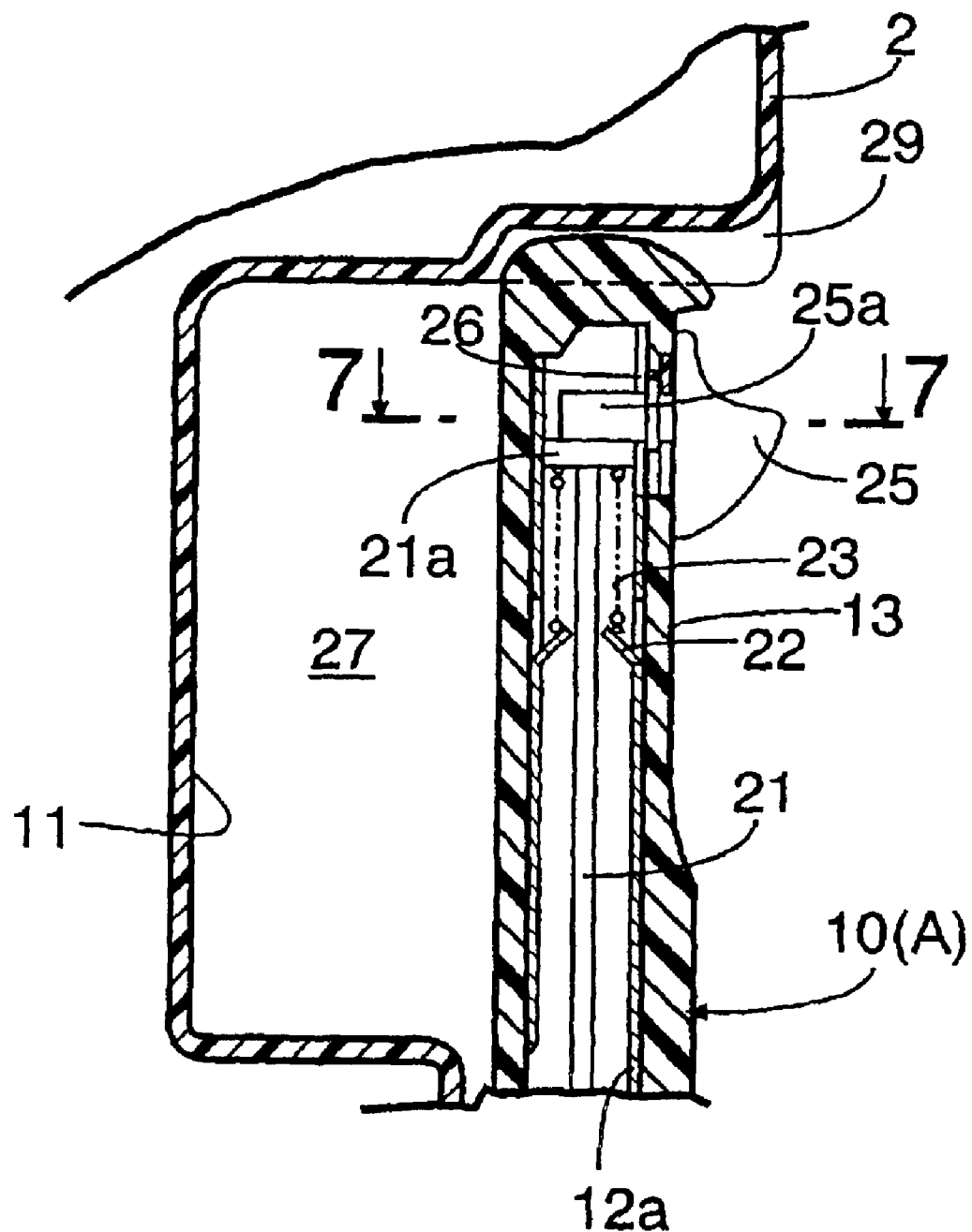
FIG. 6 is a sectional view taken along a line 6—6 in FIG. 4.
Figure 7:
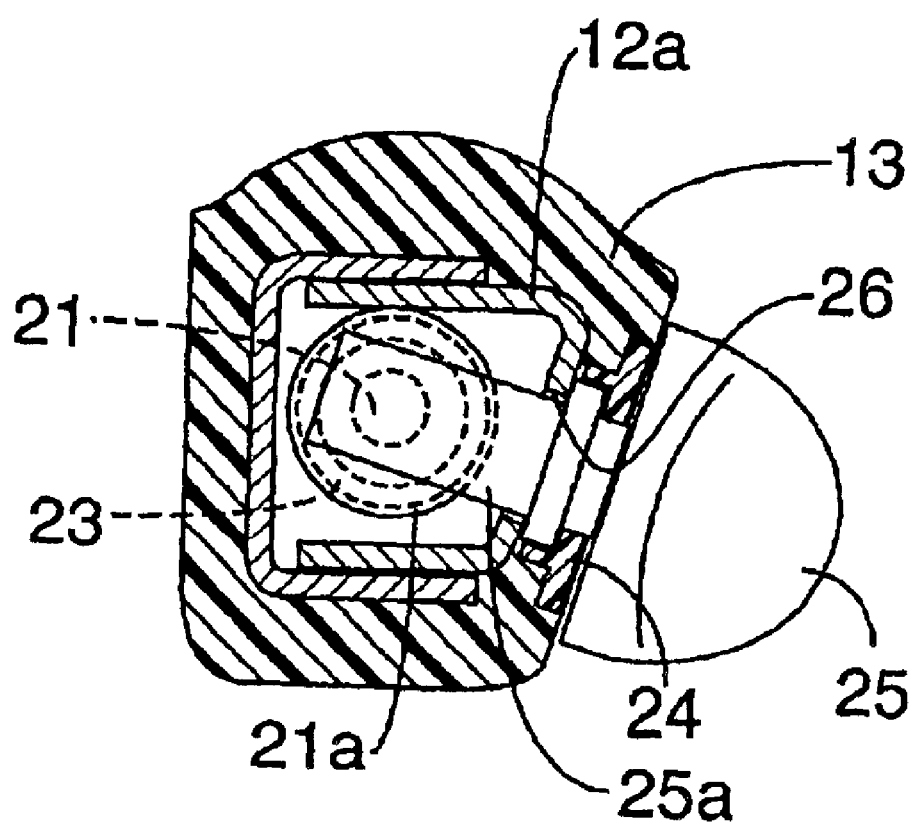
FIG. 7 is a sectional view taken along a line 7—7 in FIG. 6.

As shown in FIGS. 3, 6 and 7, a knob holder 24 embedded in the grip 13 is secured to a side of the grip portion 12a adjacent the driver's seat, and a releasing knob 25 is mounted to the knob holder 24 for sliding movement in an axial direction of the connecting rod 21. The releasing knob 25 includes an urging element 25a, which extends through an elongated bore 26 provided in a sidewall of the grip portion 12a to abut against an outer end face of the flange 21a.

The recess 11 of the console box 2, adapted to accommodate the control lever 10 in the releasing position A, has an opened side face adjacent the driver's seat, and an opened rear surface on the rear side of a vehicle body. The releasing knob 25 is disposed on a side face of the grip portion 13 corresponding to the opened side face of the recess 11. A gap g between a head of the grip 13 and an upper end wall of the recess 11, to which the grip 13 is opposed, is a gap small enough to permit the movement of the control lever 10 without being interfered with in any way by the releasing knob 25. A space 27 is provided between a sidewall and a bottom wall of the recess 11 and the grip 13, to enable the insertion of a driver's hand.

A positioning means 28, for defining the releasing position A of the control lever 10, is provided between the head of the grip 13 and an upper end wall of the recess 11. The positioning means 28 includes a projection 29 ridged on the upper end wall of the recess, and a step 30 formed on the head of the grip to abut against the projection 29. The projection 29 and the step 30 are disposed so that an upper surface of the console box 2 and an upper surface of the grip 13 are substantially flush with each other upon the control lever 10 reaching the releasing position A, at the abutment of the projection 29 and the step 30 against each other.

Further, a protrusion 13a is formed on the head of the grip 13 to project toward a bottom surface of the recess 11, in order to define the limit of grasping of the head of the grip 13 by a driver, thereby preventing the driver's hand from being pinched.

The operation of the embodiment is described below.

When the driver grasps the grip 13 and moves the control lever 10 to the operating position B as shown in FIG. 5, the brake wire 16 is pulled to operate the parking brake. In this case, even if the releasing knob 25 is not operated, the claw 19a of the ratchet pole 19 is only slid on the ratchet gear 17 and does not obstruct the movement of the control lever 10 to the operating position B. However, when the control lever 10 is stopped at the operating position B, the ratchet gear 17 and the ratchet pole 19 exhibit a one-way locking function by cooperation with the operating spring 23, whereby the control lever 10 is locked at a given position, i.e., at the operating position B.

To release the operation of the parking brake, the releasing knob 25 is first pushed down toward the connecting rod 21, while once pulling control lever 10 upwards in an operating direction, thereby moving the connecting rod 21 against a biasing force of the operating spring 23 to turn the ratchet pole 19 away from the ratchet gear 17. If the control lever 10 is turned to the releasing position A shown in FIG. 4 in this manner, the operation of the parking brake can be released.

The control lever 10 is accommodated in the recess 11 of the console box 2 in the releasing position A, and the releasing knob 25 is disposed on the side face of the grip 13 corresponding to the opened side face of the recess 11. By this configuration, the gap g between the upper end wall of the recess 11 and the head of the grip 13 can be a small gap. Since the releasing position A of the control lever 10 may be defined by the positioning means 28 constructed between the head of the grip 13 and the upper end wall of the recess 11, where the upper surfaces of the console box 2 and the control lever 10 are substantially flush with each other, a continuity is provided on the upper surfaces of the console box 2 and the control lever 10. The structure thereby integrates the console box 2 and the control lever 10 to provide an enhancement in beauty of the console box 2. Moreover, the positioning means 28 does not appear on the surface of the console box 2, and therefore does not diminish the integration. This allows for maintaining the beauty of the console box 2, and for ensuring adequate space 27 for insertion of the driver's fingers for grasping the grip 13.

The releasing knob 25 is disposed on a peripheral surface of the grip 13 and hence, when the grip 13 is grasped, the releasing knob 25 can be operated by the fingers grasping the grip 13. Namely, it is unnecessary to take the trouble of moving the thumb to the head of the grip as with conventional brake levers, leading to an improved operability of the releasing knob 25.

When the driver grasps the grip 13 to return the control lever 10 from the operating position B to the releasing position A, she can sense the limit of grasping of the head of the grip 13 by the protrusion 13a of the head of the grip 13 projecting to the bottom surface of the recess 11. Therefore, the finger Y of the driver cannot protrude from the head of the grip 13 and can be prevented from being sandwiched and/or pinched between the head of the grip 13 and the inner wall of the recess 11.

Figure 8:
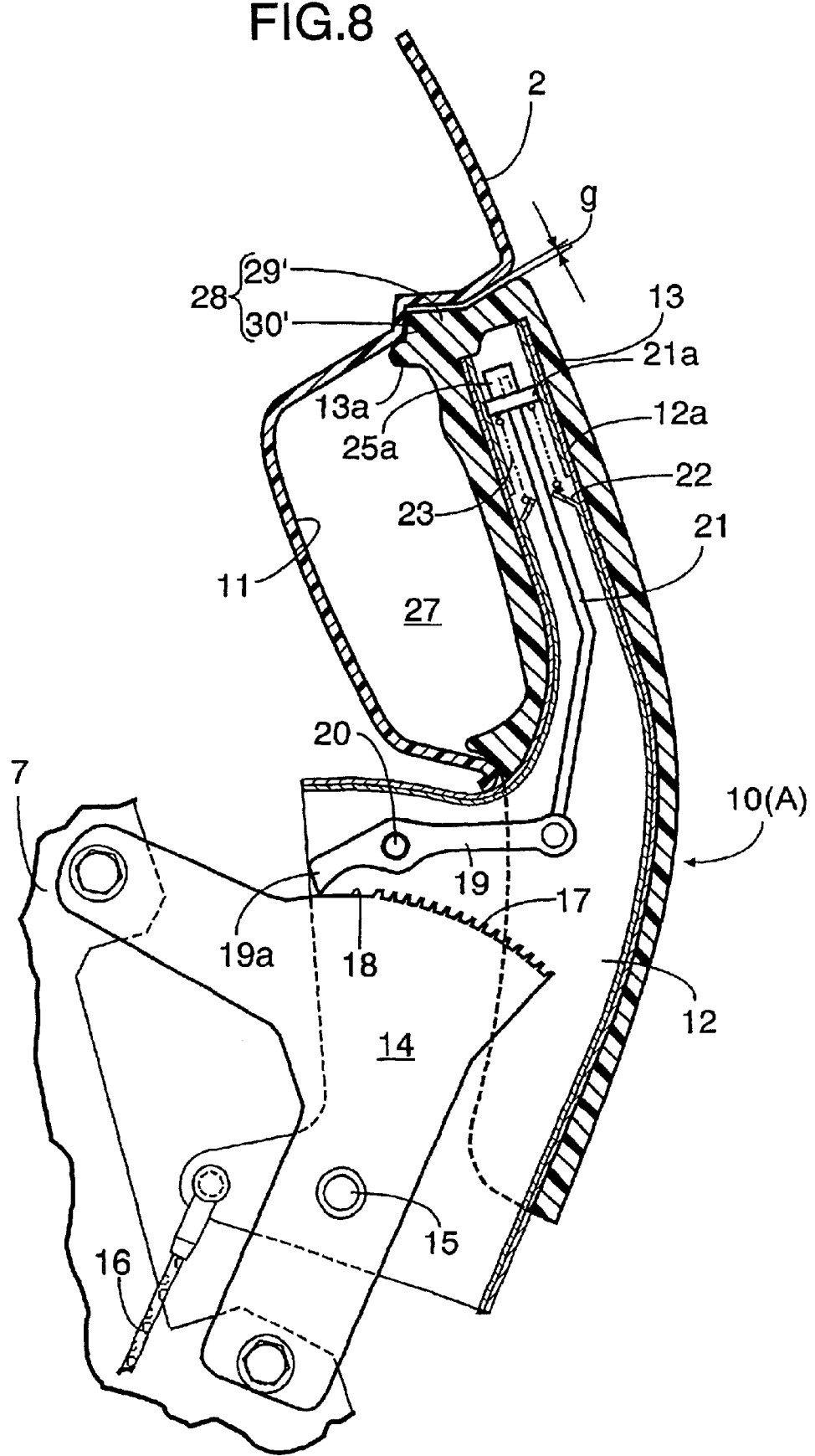
FIG. 8 is a sectional view similar to FIG. 4, but showing a second embodiment of the present invention.

A second embodiment of the present invention shown in FIG. 8 is different from the above-described embodiment in respect of the construction of a positioning means 28 for defining the releasing position A of the control lever 10. More specifically, the positioning means 28 in the second embodiment includes a projection 29' formed on a head of a grip 13 of a control lever 10, and a step 30' formed on the upper end wall of the recess 11 of the console box 2 to receive the projection 29' in the releasing position A of the control lever 10. The remainder of the second embodiment is the same as in the previous embodiment and hence, portions or components corresponding to those in the previous embodiment are designated by like reference characters, and the description of them is omitted.

Figure 9:
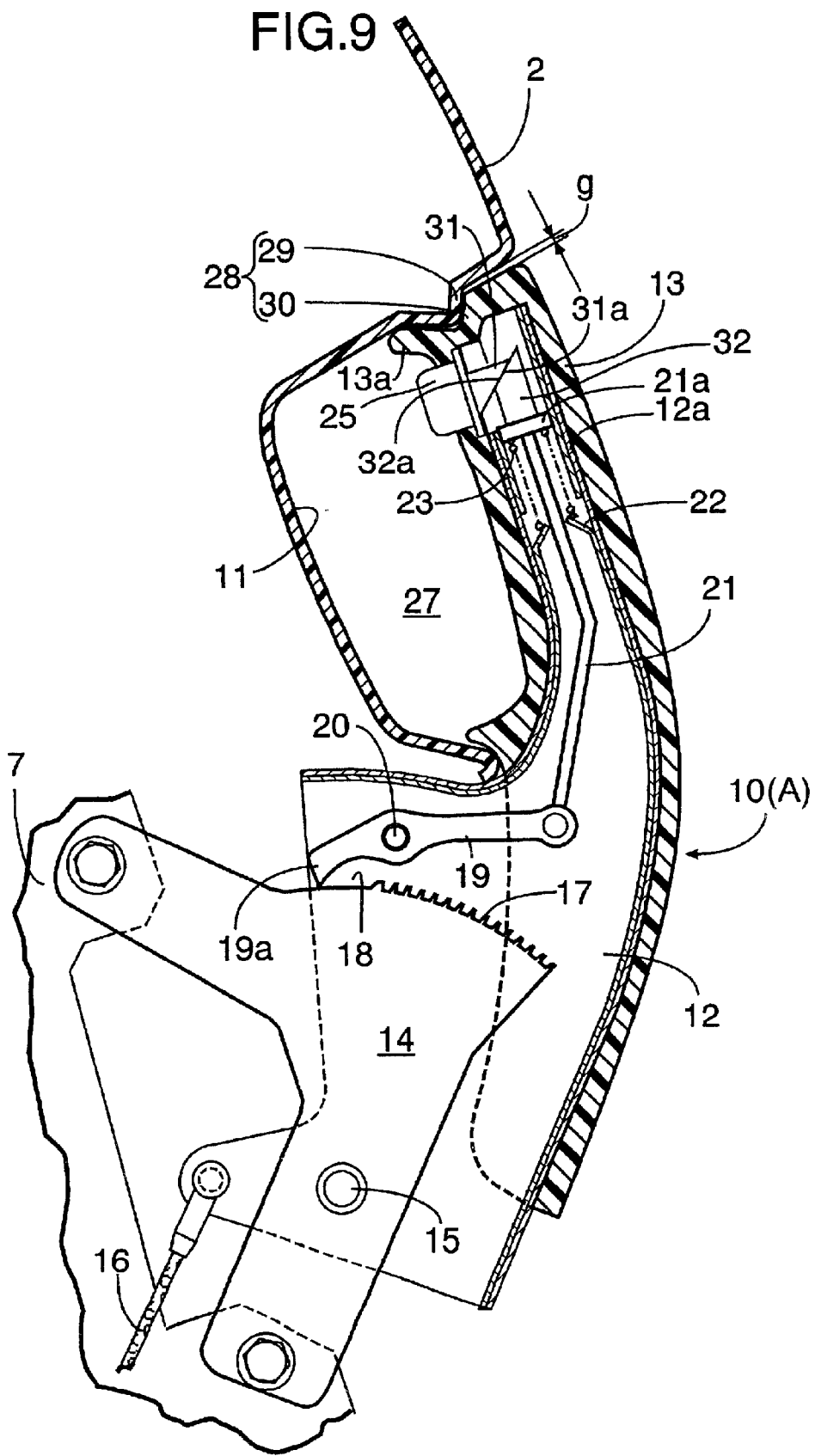
FIG. 9 is a sectional view similar to FIG. 4, but showing a third embodiment of the present invention.

A third embodiment of the present invention shown in FIG. 9 is described below.

A releasing knob 25 of a grip 13 of a control lever 10 is mounted in a recess 11 of a console box 2 for movement either toward or away from a bottom of the recess 11. Namely, the releasing knob 25 is disposed on a front surface of the grip 13 opposed to a bottom surface of the recess 11. The releasing knob 25 and a flange 21a of a connecting rod 21 are integrally formed with an urging element 31 and a receiving element 32 having slants 31a and 32a slidably abutting against each other, respectively. The remainder of the third embodiment is the same as in the first embodiment and hence, portions or components corresponding to those in the first embodiment are designated by like reference characters in FIG. 9 and the description of them is omitted.

Figure 10:
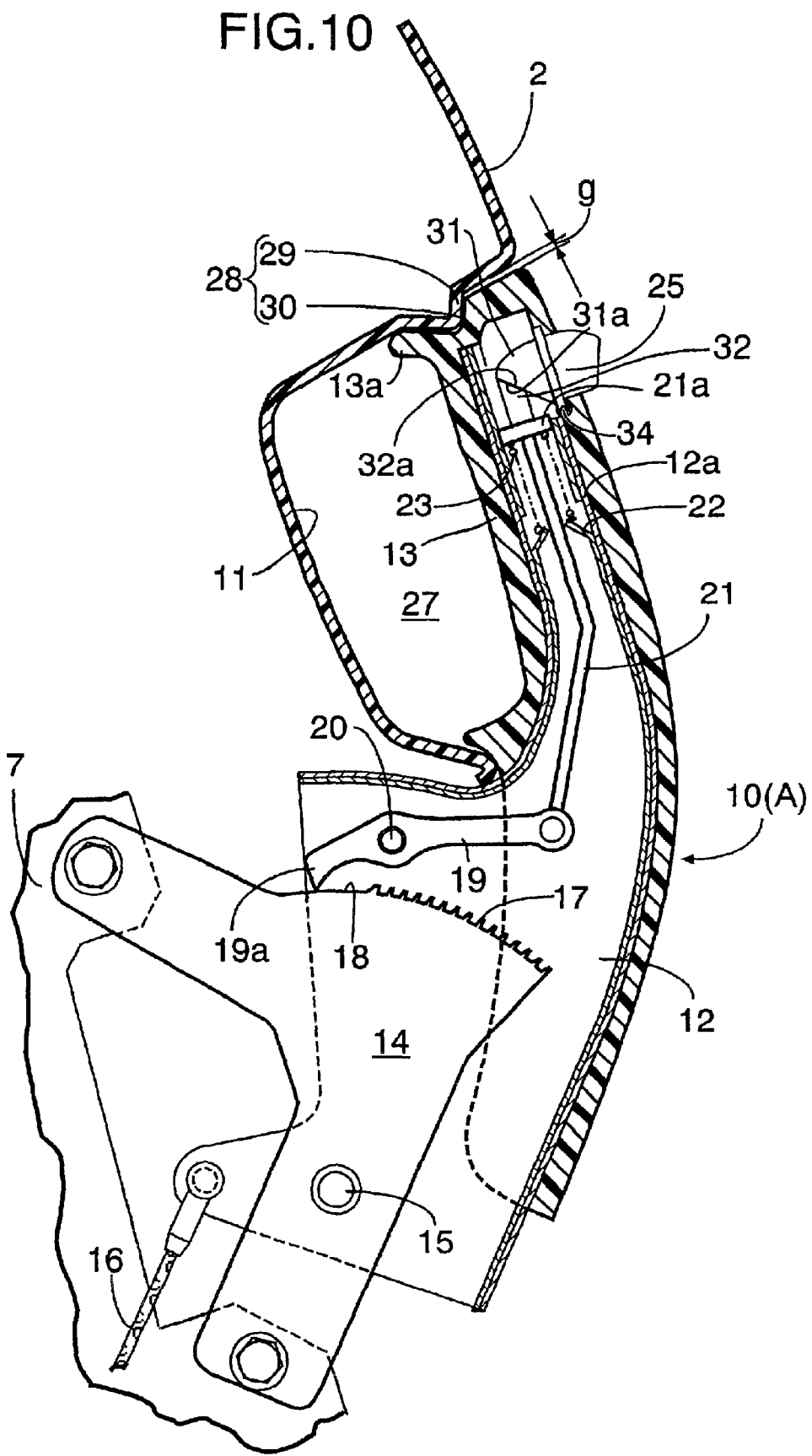
FIG. 10 is a sectional view similar to FIG. 9, but showing a fourth embodiment of the present invention.

Moreover, the third embodiment is similar to the first embodiment in respect of the capability to effectively integrate the console box 2 and the control lever 10, but it is possible to provide a further enhancement in beauty of the control lever 10 by hiding of the releasing knob 25 in the recess 11. A fourth embodiment of the present invention shown in FIG. 10 is described below.

In the fourth embodiment, a releasing knob 25 is disposed on a rear surface of a grip 13 corresponding to the opened rear surface of the recess 11 of the console box 2. In this case, the releasing knob 25 is rotatably attached to the receiving element 32 through a pivot 34.

The remainder of the fourth embodiment is the same as in the third embodiment and hence, portions or components corresponding to those in the third embodiment are designated by like reference characters and the description of them is omitted.

With the above construction, when a driver grasps the grip 13, his thumb naturally reaches a place at the releasing knob 25 and hence, he can push the releasing knob 25 lightly with his thumb.

Figure 11:
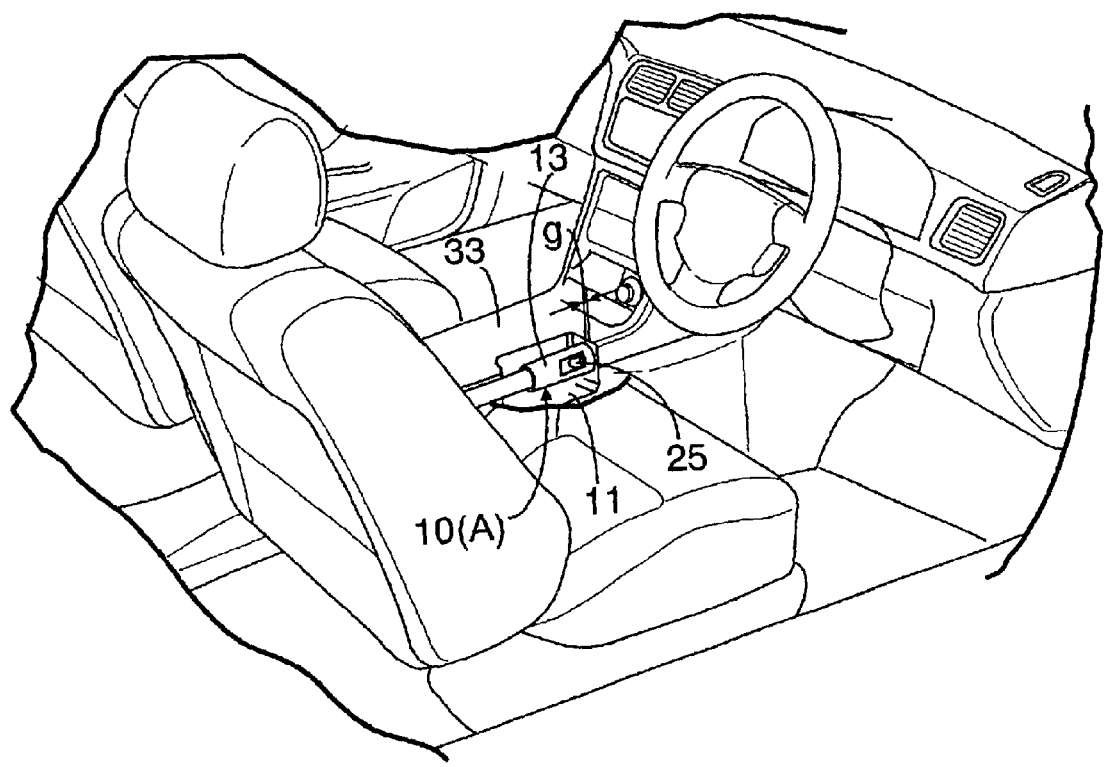
FIG. 11 is a perspective view of a control lever system for a parking brake according to a fifth embodiment of the present invention.

In a fifth embodiment of the present invention shown in FIG. 11, a notched recess 11 for accommodation of a grip 13 in a releasing position A of a control lever 10 is defined in an upper edge of a center console 33 of an automobile adjacent a driver's seat, and a releasing knob 25 is disposed on a side face of the grip 13 facing an opened side face of the recess 11.

The present invention is not limited to the above-described embodiments, and various modifications may be made without departing from the subject matter of the present invention. For example, the structures of attachment of the releasing knob 25 in the first to fourth embodiments may be replaced by one another.

As discussed above, according to the first aspect of the present invention, in the control lever system for the parking brake, in which the control lever for the parking brake is mounted to the interior equipment of the vehicle for moving between the operating position in which it operates the parking brake and the releasing position in which it releases the operation of the parking brake, and where the recess is provided for accommodating the control lever when the control lever occupies the releasing position, the releasing knob operated for returning the control lever from the operating position to the releasing position is disposed on the peripheral surface of the grip of the control lever facing the opened face of the recess. Therefore, when the control lever is in the releasing position, it is accommodated in the recess and moreover, the releasing knob is disposed on the peripheral surface of the grip corresponding to the opened face of the recess. Thus, the gap between the inner wall of the recess and the head of the grip can be narrowed without being interfered with in any way by the releasing knob. A resultant integration between the interior equipment and the control lever provides an enhancement in beauty of the interior equipment. Moreover, by disposing the releasing knob on the peripheral surface of the grip, when the driver grasps the grip, he can operate the releasing knob by fingers grasping the grip. Namely, it is unnecessary to take the trouble of moving the driver's thumb toward the head of the grip, as in the prior art, leading an improved operability of the releasing knob.

According to the second aspect of the present invention, in the control lever system for the parking brake, in which the control lever for the parking brake is mounted to the interior equipment of the vehicle for moving between the operating position in which it operates the parking brake and the releasing position in which it releases the operation of the parking brake, and the recess is provided for accommodating the control lever when the control lever occupies the releasing position, the releasing knob operated for returning the control lever from the operating position to the releasing position is disposed on the peripheral surface of the grip of the control lever opposed to the bottom surface of the recess. Therefore, as in the first aspect, the gap between the inner wall of the recess and the head of the grip can be narrowed without being interfered with in any way by the releasing knob, and a resultant integration between the interior equipment and the control lever provides an enhancement in beauty of the interior equipment. In addition, the releasing knob exists on the peripheral surface of the grip and hence, when the driver grasps the grip, she can operate the releasing knob by fingers grasping the grip, leading to an improved operability of the releasing knob. Moreover, the releasing knob is hidden in the recess, effecting an enhancement in beauty of the control lever.

According to the third aspect of the present invention, the positioning means is provided between the inner wall of the recess and the head of the grip for defining the releasing position of the control lever, to ensure that the outer surfaces of the interior equipment and the control lever are substantially flush with each other. This provides continuity to the outer surfaces of the interior equipment and the control lever, achieving integration between the interior equipment and the control lever. Moreover, the positioning means does not appear on the surface of the interior equipment, which is convenient for maintaining the beauty of the interior equipment, and the space for insertion of the driver's fingers grasping the grip can be assured.

According to the fourth aspect of the present invention, a protrusion is formed on the head of the grip to project toward the bottom surface of the recess to define the limit of grasping of the head of the grip by the driver. Therefore, when the driver grasps the grip, the driver's fingers are inhibited by the protrusion from projecting beyond the head of the grip. As a result, the driver's fingers grasping the grip are prevented from being sandwiched and/or pinched between the head of the grip and the inner wall of the recess when the control lever is returned from the operating position to the releasing position.

What is claimed is:

1. A control lever system for a parking brake, comprising:
   a control lever for the parking brake, which is mounted to a console of a vehicle for moving between an operating position (B) in which it operates the parking brake, and a releasing position (A) in which it releases the operation of the parking brake, said console being located between left and right front seats of the vehicle;
   a recess that accommodates the control lever when the control lever occupies the releasing position (A),
   said recess being in said console arid having an open lateral face at a lateral side thereof; and
   a releasing knob operative for returning the control lever from the operating position (B) to the releasing position (A), the releasing knob being disposed on a peripheral surface of a grip portion of the control lever, the peripheral surface being exposed in the lateral open face of the recess when the control lever occupies the releasing position so that the releasing knob is positioned to face said open lateral face of the recess,
   said control lever having a base end, pivotably mounted co said console, and an opposite head end which is free of any releasing knob, said peripheral surface being located only between said base end and said head end of said control lever, and
   a clearance between said head end of said control lever and an end wall of said recess, which is opposed to said head end, said clearance being just large enough to permit only movement of said control lever without being interfered with in any way by said end wall of said recess;
   said control lever system further comprising positioning means disposed between an inner wall of the recess and a head of the grip around said head end of said control lever, the positioning means defining the releasing position (A) of the control lever to ensure that outer surfaces of both the console and the control lever are substantially flush with each other.

2. A control lever system for a parking brake according to claim 1, further comprising a protrusion formed on a head of the grip around said head end of said control lever, the protrusion projecting toward a bottom surface of the recess, the protrusion defining a limit of grasping of the head of the grip by a driver.

3. A control lever system for a parking brake according to claim 1, further comprising a protrusion formed on said head of the grip, the protrusion projecting toward a bottom surface of the recess, the protrusion defining a limit of grasping of the head of the grip by a driver.

4. A control lever system for a parking brake according to claim 1, wherein the releasing position (A) is substantially vertical.

5. A control lever system for a parking brake according to claim 4, wherein the control lever is disposed in a driver-facing front dash of a vehicle.

6. A control lever system for a parking brake, comprising:
   a control lever for the parking brake, which is mounted to a console of a vehicle for moving between an operating position (B) in which it operates the parking brake, and a releasing position (A) in which it releases the operation of the parking brake,
   said console being located between left and right front seats of the vehicle;
   a recess for accommodating the control lever when the control lever occupies the releasing position (A),
   said recess being in said console and having an open lateral face at only one lateral side thereof; and
   a releasing knob operative for returning the control lever from the operating position (B) to the releasing position (A), the releasing knob being disposed on a peripheral surface of a grip portion of the control lever, the peripheral surface facing a bottom surface of the recess when the console lever occupies the releasing position (A) so that the releasing knob is positioned to face said bottom surface of the recess,
   said control lever having a base end, pivotably mounted to said console, and an opposite head end which is free of any releasing knob, said peripheral surface being located only between said base end and said head end of said control lever, and a clearance between said head end of said control lever and an end wall of said recess, which is opposed to said head end, said clearance being just large enough to permit only movement of said control lever without being interfered in any way with by said end wall of said recess;

said control lever system further comprising positioning means disposed between an inner wall of the recess and a head of the grip around said head end of said control lever, the positioning means defining the releasing position (A) of the control lever to ensure that outer surfaces of both the console and the control lever are substantially flush with each other.

7. A control lever system for a parking brake according to claim 6, further comprising a protrusion formed on a head of the grip around said head end of said control lever, the protrusion projecting toward said bottom surface of the recess, the protrusion defining a limit of grasping of the head of the grip by a driver.

8. A control lever system for a parking brake according to claim 6, further comprising a protrusion formed on said head of the grip, the protrusion projecting toward a bottom surface of the recess, the protrusion defining a limit of grasping of the head of the grip by a driver.

9. A control lever system for a parking brake according to claim 6, wherein the releasing position (A) is substantially vertical.

10. A control lever system for a parking brake according to claim 9, wherein the control lever is disposed in a driver-facing front dash of a vehicle.

* * * * *